United States Patent
Reynolds et al.

(10) Patent No.: US 9,944,461 B2
(45) Date of Patent: Apr. 17, 2018

(54) PRODUCTS STORAGE RACKS AND METHODS OF STORING PRODUCTS

(71) Applicant: Wal-Mart Stores, Inc., Bentonville, AR (US)

(72) Inventors: John M. Reynolds, Springdale, AR (US); Thomas L. McClarty, Siloam Springs, AR (US); Morgan D. Reiner, Keller, TX (US); Olivia H. Bozik, Piedmont, SC (US); Richard T. Wilkinson, Chesapeake, VA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/366,171

(22) Filed: Dec. 1, 2016

(65) Prior Publication Data
US 2017/0158428 A1    Jun. 8, 2017

Related U.S. Application Data

(60) Provisional application No. 62/262,212, filed on Dec. 2, 2015.

(51) Int. Cl.
*A47B 43/00* (2006.01)
*A47B 47/00* (2006.01)
(Continued)

(52) U.S. Cl.
CPC ............... *B65G 1/02* (2013.01); *A47B 57/26* (2013.01); *B65D 19/12* (2013.01)

(58) Field of Classification Search
CPC ......... B65G 1/02; A47B 57/26; A47B 57/265; A47B 87/02; A47B 87/0207; B65D 19/12; B65D 19/30; B65D 19/38; B65D 19/44; B65D 19/385; B65D 2519/00; B65D 2519/00004; B65D 19/00; B65D 19/0004; B65D 2519/00935
USPC .............. 211/194, 188; 108/76, 107, 147.13, 108/51.11, 53.1, 54.1, 57.16; 206/511, 206/386, 599, 600; 220/1.5, 16; 248/346.02
See application file for complete search history.

(56) References Cited

U.S. PATENT DOCUMENTS 2,896,799 A    7/1959   Crane
2,998,141 A *  8/1961   Moore ................ B65G 49/062
                                                     108/53.3

(Continued)

OTHER PUBLICATIONS

PCT; App. No. PCT/US2016/064124; International Search Report and Written Opinion dated Jan. 31, 2017.

*Primary Examiner* — Jennifer E. Novosad
(74) *Attorney, Agent, or Firm* — Fitch, Even, Tabin & Flannery LLP

(57) ABSTRACT

Some embodiments provide a product storage racking system, comprising: a frame comprising frame beams secured together with support surfaces aligned along a first plane; feet posts fixed to the frame beams; feet cooperated with the feet posts, wherein each of the feet is configured to stackably cooperate with a post of a set of posts that are cooperated with another product storage racking system enabling stacking; at least two rack support systems each secured with the frame and configured to support the weight of the product storage racking system and products stored on the product storage racking system independent of the three or more feet.

7 Claims, 8 Drawing Sheets

(51) Int. Cl.
  *A47B 57/00* (2006.01)
  *B65G 1/02* (2006.01)
  *A47B 57/26* (2006.01)
  *B65D 19/12* (2006.01)

(56) References Cited

U.S. PATENT DOCUMENTS

| | | | | |
|---|---|---|---|---|
| 3,207,095 A | * | 9/1965 | Hiatt, Jr. | A47B 7/0223 |
| | | | | 108/53.5 |
| 3,647,080 A | | 3/1972 | Denny | |
| 4,186,841 A | * | 2/1980 | Buckley | B65D 19/12 |
| | | | | 206/511 |
| 4,227,634 A | | 10/1980 | Ramsey | |
| 4,662,532 A | * | 5/1987 | Anderson | B65D 19/12 |
| | | | | 220/1.5 |
| 4,703,702 A | * | 11/1987 | Speicher | B65D 19/385 |
| | | | | 108/52.1 |
| 4,754,712 A | | 7/1988 | Olson | |
| 4,773,547 A | * | 9/1988 | Bell | A47B 87/0215 |
| | | | | 108/53.1 |
| 4,934,538 A | * | 6/1990 | Beyer | B65D 85/48 |
| | | | | 211/194 |
| 4,982,851 A | | 1/1991 | Konstant | |
| 5,137,194 A | | 8/1992 | Kodis | |
| 5,520,316 A | * | 5/1996 | Chen | B60R 7/02 |
| | | | | 211/12 |
| 5,588,372 A | * | 12/1996 | Kelly | B65D 19/385 |
| | | | | 108/53.1 |
| 5,692,625 A | * | 12/1997 | Filipescu | A47B 43/00 |
| | | | | 211/194 |
| 5,971,175 A | * | 10/1999 | Bustos | A47B 57/265 |
| | | | | 211/187 |
| 6,279,763 B1 | * | 8/2001 | Bush | A47B 43/00 |
| | | | | 108/55.1 |
| 6,422,405 B1 | * | 7/2002 | Haenszel | A47B 45/00 |
| | | | | 108/55.1 |
| 6,557,917 B1 | | 5/2003 | Colcombe | |
| 6,726,041 B2 | * | 4/2004 | Dunn | B65D 19/12 |
| | | | | 206/335 |
| 6,935,523 B2 | | 8/2005 | Ahn | |
| 7,802,526 B2 | * | 9/2010 | Brady | B65D 19/12 |
| | | | | 108/53.5 |
| 7,967,157 B2 | * | 6/2011 | Bilotto | A47F 5/12 |
| | | | | 211/182 |
| 7,997,213 B1 | * | 8/2011 | Gauthier | B65D 88/022 |
| | | | | 108/53.1 |
| 8,002,128 B2 | * | 8/2011 | Kern | B65D 19/12 |
| | | | | 211/194 |
| 8,210,374 B2 | * | 7/2012 | Harpole | B65D 19/12 |
| | | | | 211/194 |
| 8,453,861 B2 | | 6/2013 | Joubert | |
| 8,875,909 B2 | * | 11/2014 | Gerkensmeier | B65D 19/44 |
| | | | | 211/175 |
| 9,027,767 B2 | | 5/2015 | Buckley | |
| 9,340,322 B2 | * | 5/2016 | Harris | B65D 19/385 |
| 9,493,295 B2 | * | 11/2016 | Glover | B65D 19/44 |
| 2007/0095775 A1 | * | 5/2007 | Beck | B65D 19/12 |
| | | | | 211/194 |
| 2015/0274358 A1 | | 10/2015 | Hidalgo | |
| 2017/0158428 A1 | * | 6/2017 | Reynolds | B65G 1/02 |

* cited by examiner

PRODUCTS STORAGE RACKS AND METHODS OF STORING PRODUCTS

CROSS-REFERENCE TO RELATED APPLICATION

This application claims the benefit of U.S. Provisional Application No. 62/262,212, filed Dec. 2, 2015, which is incorporated herein by reference in its entirety.

TECHNICAL FIELD

This invention relates generally to storing products relative to retail facilities, warehouses and the like.

BACKGROUND

Retail facilities typically sell and/or distributed large numbers of different products. Sometimes in the order of tens to hundreds of thousands of different products. Further, these shopping facilities typically maintain at the shopping facilities large numbers of many of these different types of products.

Accordingly, shopping facilities may at a given time have millions to tens or even hundreds of millions of products at the shopping facilities. The shopping facilities thus have to temporarily store these products. Further, facility workers often have to move these products between loading and/or unloading bays from and/or to delivery vehicles to temporary storage locations within the shopping facilities. Still further, facility workers often also have to move large numbers of products to different locations within the shopping facilities. As such, many of these shopping facilities use pallets and/or racks to temporarily store products.

BRIEF DESCRIPTION OF THE DRAWINGS

Disclosed herein are embodiments of systems, apparatuses and methods pertaining product storage racking system and temporarily storage products. This description includes drawings, wherein.

Figure 1:
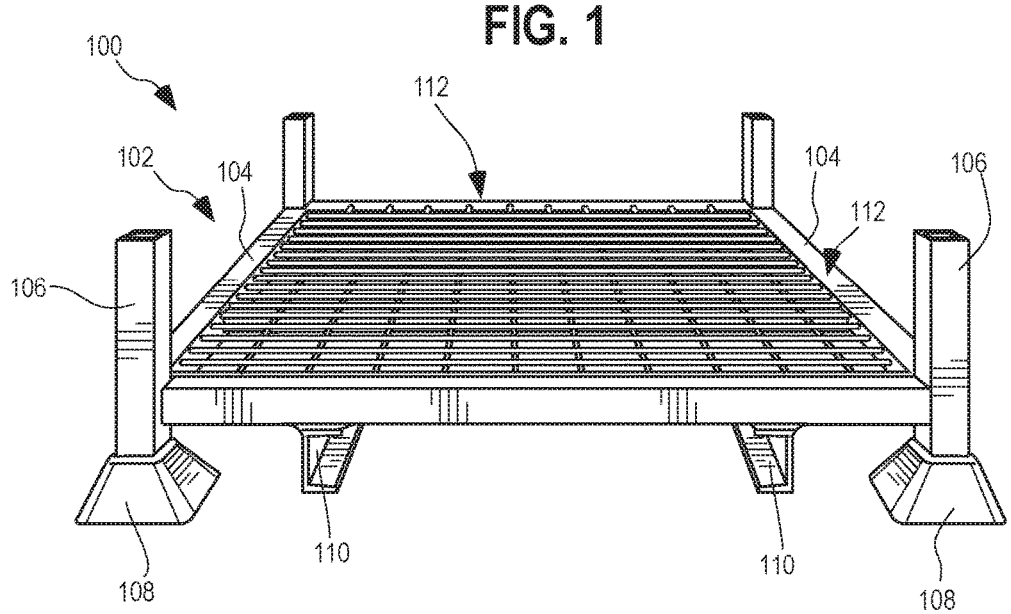
FIG. 1 illustrates an isometric, overhead view of an exemplary product storage racking system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to storing and staging products at shopping facilities, distribution centers, warehouses, and other such facilities that temporarily store products at the facility. Some embodiments provide product storage racking systems that provide multiple different modes and/or implementations of product storage. In some implementations, product storage racking systems include a frame that comprises three or more frame beams secured together to form the frame. Typically, three or more feet posts are fixed to the frame beams, with three or more feet each cooperated with one of the feet posts. Further, some embodiments further include at least two rack support systems each secured with at least one frame beam of the frame. The rack support systems are configured to support the weight of the product storage racking system and products stored in the product storage racking system independent of the three or more feet. The frame, in some instances, is formed with support surfaces of the frame beams aligned along a first plane and configured to support products and/or support a platform extending across the support surfaces upon which products are placed. The feet have base surface. In some implementations, the base surfaces of each of the feet may be substantially aligned along a second plane that is generally parallel with the first plane and that is a first distance from the frame. In some applications, the feet are further configured to stackably cooperate with a post of a set of posts that are cooperated with another product storage racking system enabling stacking of multiple of the product storage racking systems with the stacked product storage racking systems being separated by lengths of the set of posts. In some embodiments, wherein the rack support systems are separated from each other by a distance and each comprises a foundation surface such that the foundation surfaces are aligned along a third plane that is generally parallel with the first plane. The third plane is separated from the frame by a distance.

Figure 2:
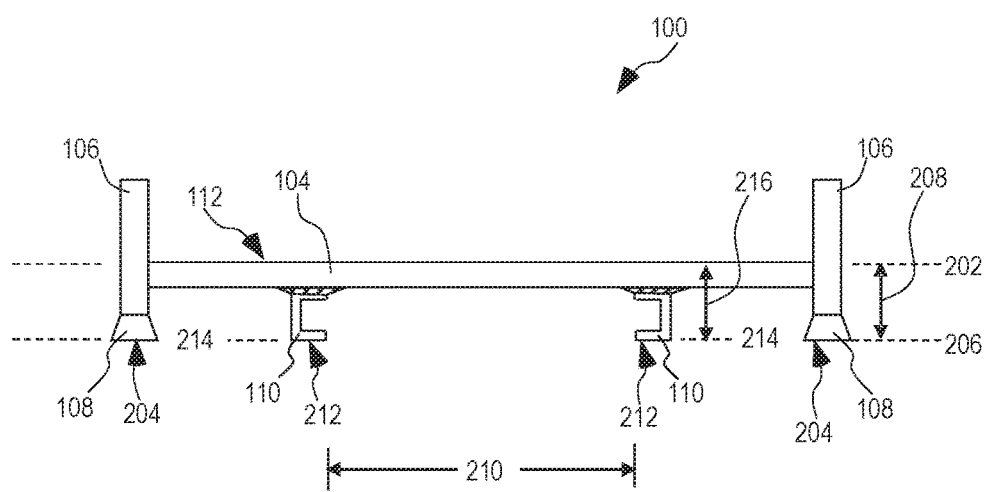
FIG. 2 illustrates a simplified plane, side view of the exemplary product storage racking system similar to that of FIG. 1, in accordance with some embodiments.
Figure 3:
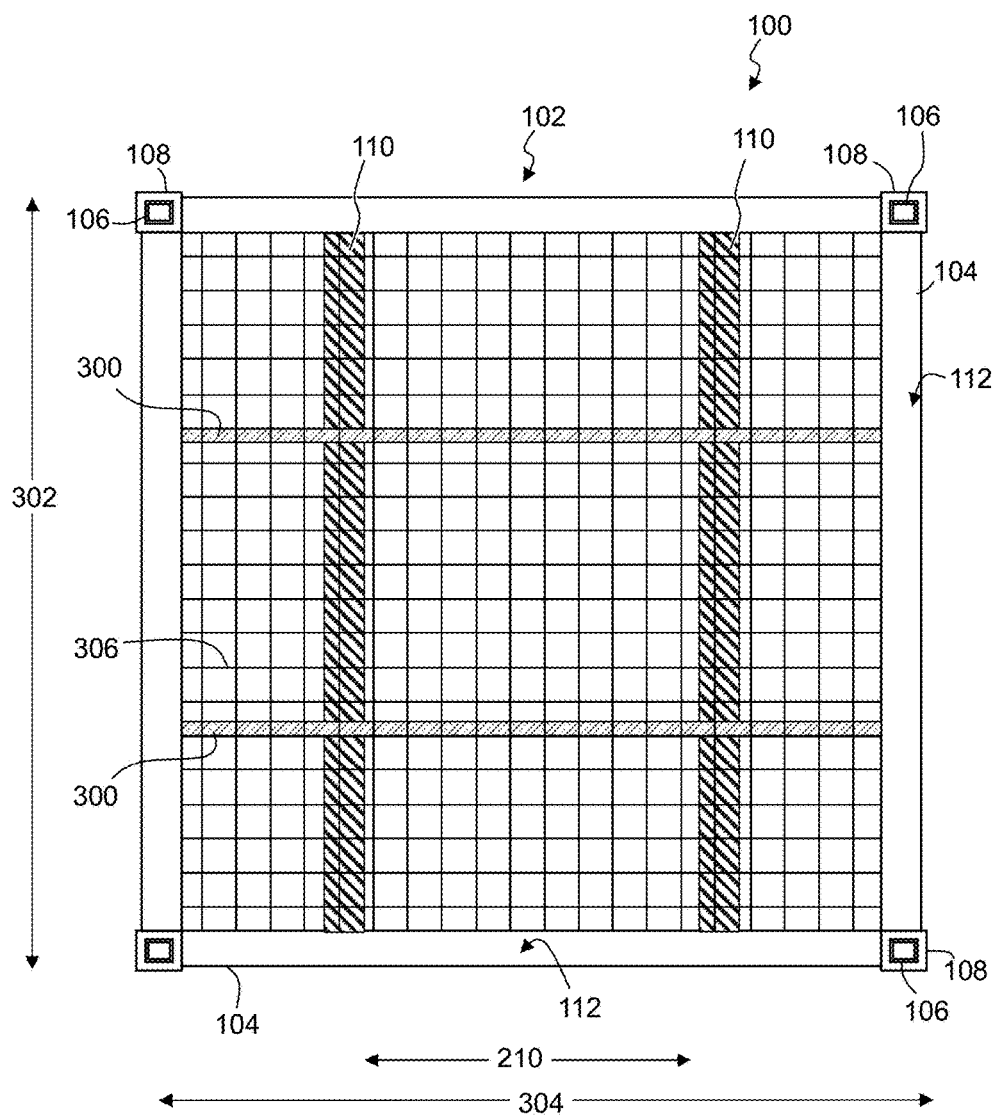
FIG. 3 illustrates a simplified plane, overhead view of the exemplary storage racking system similar to that of FIG. 1, in accordance with some embodiments.

FIG. 1 illustrates an isometric, overhead view of an exemplary product storage racking system 100, in accordance with some embodiments. FIG. 2 illustrates a simplified plane, side view of the exemplary product storage racking system 100 similar to that of FIG. 1, in accordance with some embodiments. FIG. 3 illustrates a simplified plane, overhead view of the exemplary storage racking system 100 similar to that of FIG. 1, in accordance with some embodiments. Referring to FIGS. 1-3, in some embodiments the product storage racking system 100 includes a frame 102 with multiple frame beams 104, feet posts 106, feet 108, and rack support systems 110. The storage racking system 100 is configured to receive and support products while the products are temporarily stored on the storage racking system. Products are placed on the product support surface 112. The product support surface 112 is typically defined along a first plane 202, and typically substantially parallel with the ground or a flat surface when the product storage racking system is placed on the ground or other flat surface, and/or substantially parallel with a separate rack upon which the storage racking system 100 is positioned.

The frame 102 is formed from three or more frame beams 104, and often four frame beams. The frame beams are typically secured together to form the frame 102. In some applications, the support surfaces 112 of the frame beams are aligned along the first plane 202 or a plane parallel with the first plane. The frame beams can have substantially any relevant shape, and are typically formed from beams that have square, rectangular, "I", "C", circular or other such cross-sectional shape. Further, the beams are constructed from a material with relevant thickness and/or shape to support predefined weights of one or more products, and typically multiple products, for which the storage racking system 100 is designed to support. For example, in some implementations the frame beams are formed from a metal (e.g., steel, aluminum, or other such metal alloy) with a hollow, generally square cross-section. The frame may further include one or more cross-supports 300 that are fixed with and extend between two of the frame beams 104. The cross-supports can enhance structural integrity and rigidity to the storage racking system and/or help in supporting the weight of products that are temporarily placed on the storage racking system. In embodiments, one or more gratings 306, lattice or the like that similarly can help in supporting products placed on the storage racking system.

Three or more feet posts 106 are each fixed to one or more of the frame beams 104. In some implementations, the feet posts 106 are fixedly secured at junctions between each of the frame beams 104 such that the junction secures the frame beams relative to each other forming the frame. Further, in some embodiments, the frame beams are each secured at its opposite ends with one of the feet posts such that the feet posts join two of the frame beams in forming the frame 102. In some applications, the feet posts can be similarly shaped and/or formed from similar material as those of the frame beams 104; however, can have a shape that is different than the frame beams. For example, in some implementations the frame beams are formed from a metal (e.g., steel, aluminum, or other such metal alloy) with a hollow, generally square cross-section. Further, in some instances, the feet posts are formed from a metal with the frame beams welded to the feet posts. The frame beams may instead be secured with the feet posts through other methods such as, but not limited to, secured with bolts and nuts, tongue and groove, or other such method of cooperating.

The feet 108 are each cooperated with one of the feet posts 106. For example, the feet may similarly be welded with the feet posts, secured with bolts and nuts, threadedly cooperated, or other such method of cooperating. The feet each include a base surface 204. Further, the feet are secured with the feet posts. In some embodiments, the feet are fixed in position such that the base surfaces 204 of the feet 108 are aligned along a second plane 206 that, in some implementations, is generally parallel with the first plane 202. Alternatively or additionally, the feet can include post couplings that are configured to each receive an end of a post, and the post couplings can be aligned along a plane that is generally parallel with the first plane. The feet can be constructed from substantially any material that can support the predefined weight. For example, the feet may be constructed from a metal similar to the metal used to construct the frame beams and/or feet posts. The feet may be shaped to enhance stability to the storage racking system 100. For example, the feet may taper outward such that the width of the feet are greater at the base surface than at an upper area that is secured with the feet posts. In some instances, the feet may have a generally pyramid or cone shape. Further, the base surfaces 204 of the feet and the second plane 206 are separated from the frame 102 by a distance. For example, in some instances, the base surfaces 204 and second plane 206 are separated from the support surface 112 of the frame 102 and/or the first plane 202 by a first distance 208.

The two or more rack support systems 110 are each secured with the frame 102 and typically secured with at least one of the frame beams of the frame. One or more rack support systems may extend between two of the frame beams of the frame, extend along at least a portion of a length of a frame beam, extend from a frame beam, and/or in some implementations at least extend across a length 302 or width 304 of the frame. The rack support systems are configured to support the weight of the product storage racking system 100 and products stored in and/or on the product storage racking system independent of the feet 108. In some applications, at least two of the rack support systems extend along a length of the frame and are secured on opposite ends of the rack support systems with opposing frame beams 104. The rack support systems are positioned, in some implementations, to be perpendicular to some of the cross-supports 300. Additionally, in some applications, the rack support systems may be positioned parallel to and/or aligned with one or more of the cross-supports 300. The rack support systems may be cooperated with the frame such that the rack support systems are separated from the cross-supports by a distance.

The rack support systems can be constructed from steel, aluminum, other such metal alloy, plastic, carbon fiber infused plastic, combination of such materials, or other such material that can span the frame and support the weight of the storage racking system and products. The rack support systems can have substantially any relevant shape, and are typically formed from one or more beams that have square, rectangular, "I", "C", circular or other such cross-sectional shape. The rack support systems are typically secured with the frame beams 104. For example, the rack support systems may be fixedly secured with and immobile relative to the frame such as by welding the rack support systems with two of the frame beams 104 at opposite ends of the rack support systems. Other methods may be employed in fixedly secure the rack support systems with the frame 102, such as but not limited to bolt and nut, tongue and groove, compression fit, and other such methods or combinations of such methods. In yet other embodiments, one or more of the rack support systems maybe movably secured with the frame allowing lateral movement of at least one rack support systems, which can adjust a second or separation distance 210 between the rack support systems.

The rack support systems 110 are separated from each other by the second or separation distance 210. In some implementations, the separation distance 210 is configured to be a sufficient distance to enhance stability of the storage racking system. In some applications, each rack support system may be secured along and aligned with a frame beam 104. As such, two of the rack support systems are separated by substantially the width 304 and/or length 302 of the frame. Typically, the rack support systems are separated by the separation distance 210 such that forks of a forklift, floor jack and/or other such lifting mechanism can readily be positioned adjacent to and/or round the rack support systems to engage the frame 102 and be able to lift the storage racking system. For example, two of the rack support systems can be separated by the separation distance 210 to enable forks of a forklift to insert adjacent the rack support systems and between at least two of the feet allowing the product storage racking system to be lifted by the forklift. In some instances, the separation distance 210 allows forks of a forklift to fit on the outsides of the two of the rack support systems, while in other instances the forks may be positioned with at least one of the pallet support systems between the forks.

Further, the rack support systems 110 each have a foundation surface 212. Typically, the foundation surfaces 212 of the rack support systems 110 are aligned along a third plane 214 that is generally parallel with the first plane 204 along which the support surface 112 is aligned. The third plane 214 is separated from the frame by a distance. For example, in some instances, the foundation surfaces 212 and the third plane 214 are separated from the support surface 112 of the frame 102 and/or the first plane 202 by a third distance 216. Typically, the third distance 216 is at least equal to or greater than the first distance 208 such that the foundation surfaces 212 are at least aligned with or extend beyond the base surfaces 204 of the feet from the frame.

In this configuration, the foundation surfaces 212 are in contact with a planar surface, such as a floor, shelf or the like, while the base surfaces 204 of the feet 108 may or may not be in contact with the planar surface. Accordingly, the weight of the product storage racking system, and a weight of one or more products loaded on the product storage racking system, is supported at least along the length of the rack support systems 110 when the product storage racking system is placed on a planar surface. In some embodiments, the surface area of the foundation surfaces is relatively large compared with the surface area of the base surfaces 204 of the feet 108. This relatively large area provided by the foundation surfaces in part allows for an increased area over which to distribute the weight across a flat surface (e.g., a floor, shelf, etc.) than otherwise provided by the smaller relative point loads provided by just the areas of the base surfaces 204. Accordingly, in some embodiments the sum of the surface areas of the foundation surfaces of the rack support systems is greater than a sum of surface areas of the base surfaces of the feet, such that the foundation surfaces provide an increased surface area over which the weight of the product storage racking system and products stored in the product storage racking system is distributed when resting on a flat surface.

Figure 4:
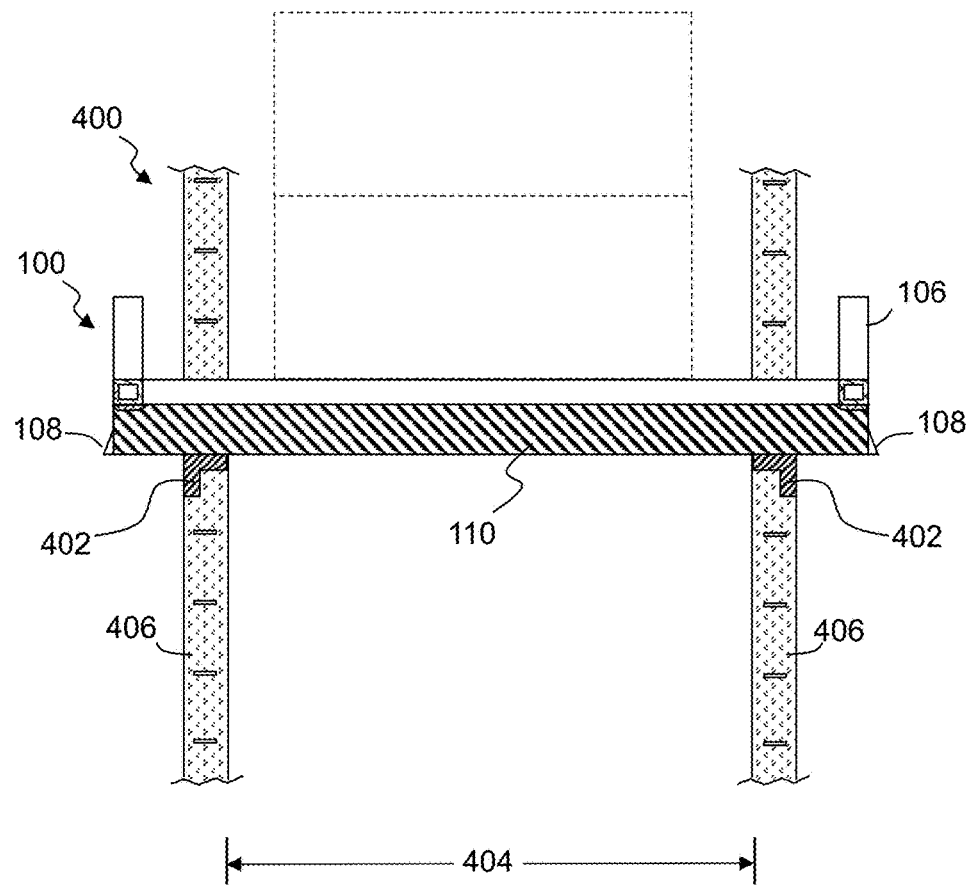
FIG. 4 illustrates a simplified cross-sectional view of part of an exemplary pallet rack with a storage racking system positioned on crossbeams of the pallet rack, in accordance with some embodiments.

Further, in some applications the rack support systems 110 are configured to span a gap between support beams of a typical pallet rack. FIG. 4 illustrates a simplified cross-sectional view of part of an exemplary pallet rack 400 with a storage racking system 100 positioned on crossbeams 402 of the pallet rack, in accordance with some embodiments. In some implementations two or more of the rack support systems 110 each comprise sections extending from one of the frame beams 104 and along at least a portion of the length of the frame such that the rack support systems are configured to rest on and span a separation distance or gap 404 between two crossbeams 402 supported by vertical supports 406 of a pallet rack. As illustrated in the embodiment depicted in FIG. 4, the feet 108 (only slightly visible behind the rack support system 110) do not readily cooperate with the crossbeams and often may extend beyond the crossbeams 402. As such, the feet often cannot be used to support the storage racking system in a pallet rack 400. Alternatively, however, the rack support system 110 extends across the separation distance 404 between crossbeams 402, with the foundation surface 212 in contact with the crossbeams 402 and supporting the weight of the storage racking system 100. Accordingly, the storage racking system can be stored in typical pallet racks 400 similar to typical pallets (e.g., wood constructed pallets designed to support products).

Further, in some embodiments, the feet 108 and feet posts 106 are configured to cooperate with another storage racking system. As such, multiple storage racking systems can be stacked and/or otherwise cooperated with each other to provide a cooperative racking system.

Figure 5:
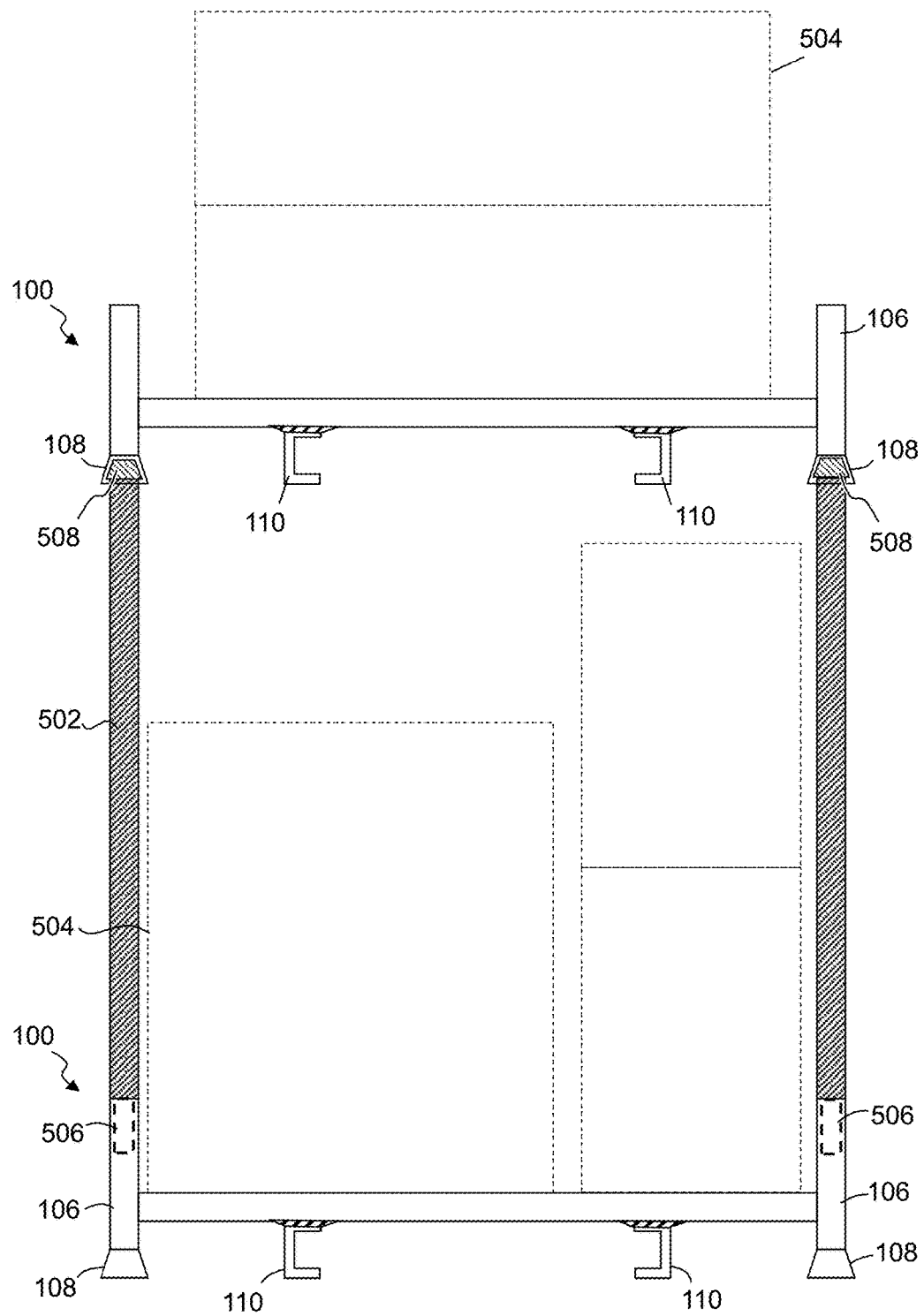
FIG. 5 illustrates a simplified plane view of two exemplary storage racking systems cooperated with each other, in accordance with some embodiments.

FIG. 5 illustrates a simplified plane view of two exemplary storage racking systems 100 cooperated with each other, in accordance with some embodiments. Typically, a set of posts 502 are used to separate the two storage racks allowing increased numbers of products 504 to be supported by and stored on the lower storage racking system. The posts in part enable the stacking of multiple of the product storage racking systems with the storage racking systems being separated by lengths of the set of posts. The posts, in some implementations, are each removably cooperated with one of the feet posts 106. The feet posts can be configured with cooperating structures and/or post couplings to more effectively cooperate with and/or secure the posts 502 with the feet posts. For example, in some implementations, the feet posts are hollow, include a hollow portion and/or include a receiving portion that provide the post couplings. The posts can include a coupling extension 506 that is inserted into the hollow portion. As such, the post couplings removably couple with a post. In other implementations the feet posts may include the coupling extensions to cooperate with a hollow portion of the posts. According, a post of a set of posts can be cooperated with each of the feet posts. Some embodiments may include aligned bores and/or apertures in the posts and feet posts allow a bolt, pin, clip, ring or other safety structure to be inserted to help secure the posts with the storage racking system.

Further, in some embodiments, the feet 108 of the storage racking system 100 are further configured to cooperate with the posts 502. In some implementations the feet include post couplings to each receive an end of a post. Each of the post coupling of the feet are configured to receive and stackably cooperate with a post of a set of posts. Typically, the set of posts are cooperated with another, lower product storage racking system. The post couplings can include, for example, a hollow portion of the feet into which a post coupling mating structure 508 or other portion of the post 502 can be inserted or vice versa. In some instances, the hollow portion may extend into the feet posts allowing the post coupling mating structure to extend through the feet and into a portion of the feet posts. Additionally or alternatively, the feet 108 may be shaped consistent with the post coupling mating structure 508 and be configured to cooperatively join with the correspondingly shaped post coupling mating structure 508 of at least one end of the post 502. For example, the feet may be generally shaped as a hollow four sided pyramid that receives a similarly shaped four sided pyramid shaped post coupling mating structure that fits within the hollow feet. In other implementations, for example, the post coupling mating structure may include a generally spherical extension that fits within a correspondingly shaped socket formed in the feet. Similarly, the feet 108 may be configured to fit within the post coupling mating structure 508 of the posts 502. Additionally, in some applications the feet, base surfaces 204, and/or the post couplings of each of the feet are aligned along a plane that is substantially parallel with the plane defined along the product support surface 112 such that the storage racking system and the product support surface is level when stacked on another storage racking system. Further, some embodiments may include aligned bores and/or apertures allow a bolt, pin, clip, ring or other safety structure to be inserted to help secure the posts with the storage racking system. As such, the cooperation between the coupling extensions 506 of the posts 502 and the feet posts 106, and the feet 108 and the post coupling mating structures 508 help to provide additional stability of the stacked storage racking systems 100.

Figure 6A:
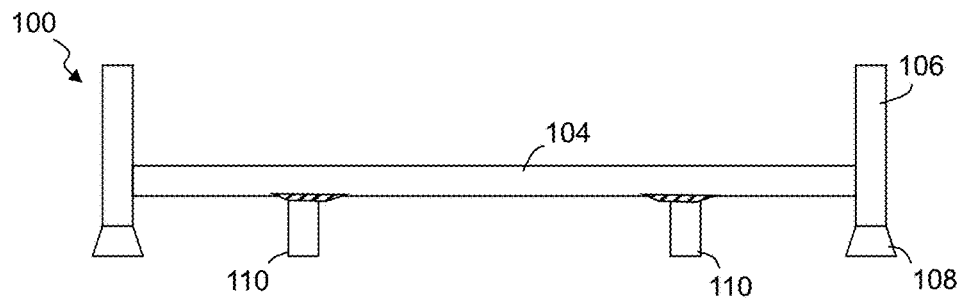
FIGS. 6A-6C illustrate side, plane views of exemplary storage racking systems in accordance with various embodiments.
Figure 6B:
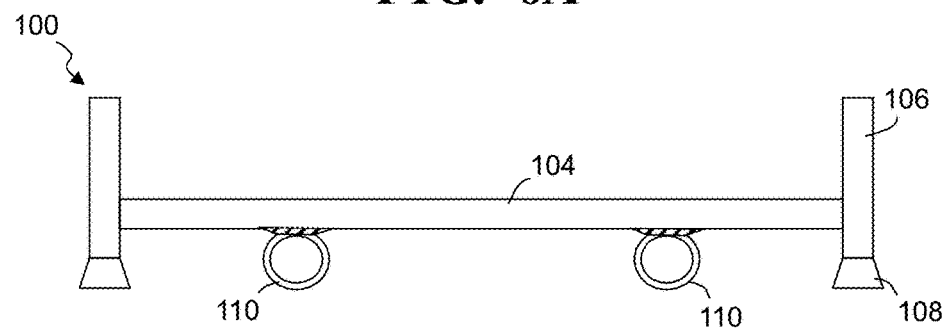
Figure 6C:
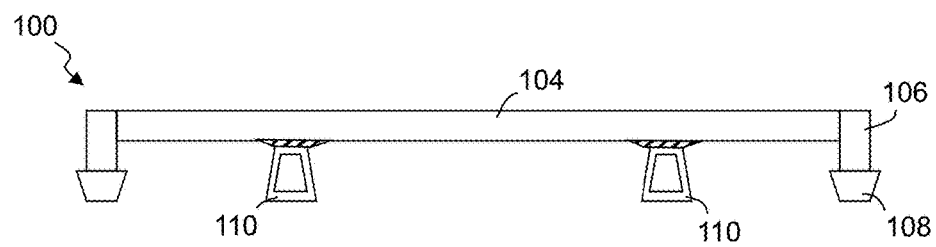
Figure 7A:
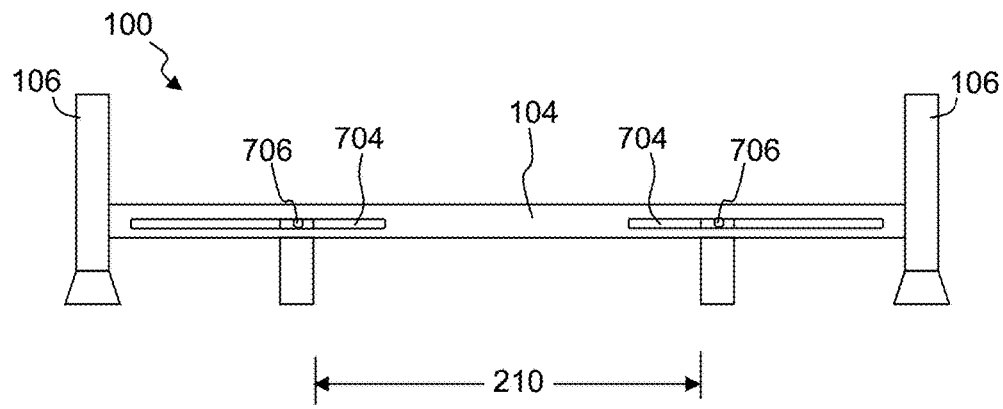
FIGS. 7A-7B illustrate side, plane views of exemplary storage racking systems in accordance with various embodiments.
Figure 7B:
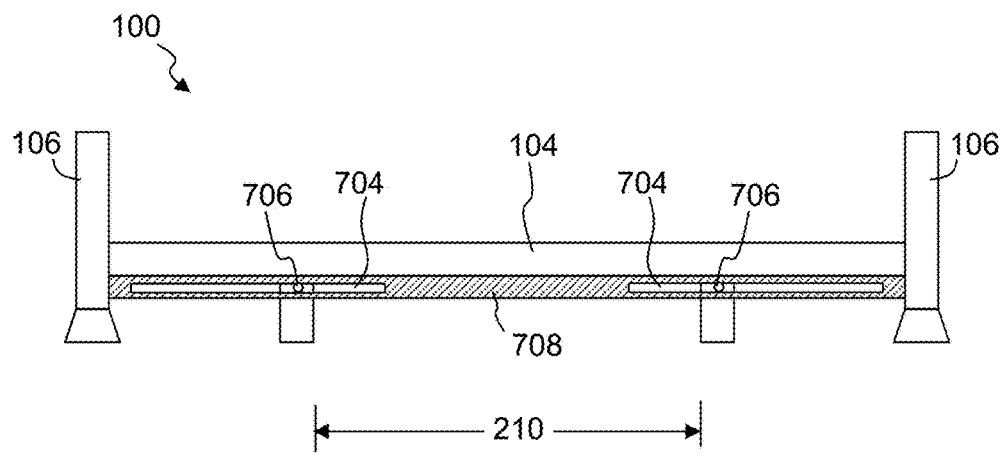

As introduced above, the shape of the rack support systems 110 may vary depending on one or more factors. FIGS. 6A-6C illustrate side, plane views of exemplary storage racking systems 100 in accordance with various embodiments. As shown in FIGS. 6A-6C, the rack support systems 110 may be implemented in various cross-sectional shapes, such as but not limited to rectangular, circular, ring, cuneate, fusiform, tapered, pyramid, or other such shapes. Further, the rack support systems 110 may be secured through welding, bolts and nuts, and the like. Still other embodiments enable the separation distance 210 between rack support systems to be varied. FIGS. 7A-7B illustrate side, plane views of exemplary storage racking systems 100 in accordance with various embodiments. In some implementations, one or more of the rack support systems 110 can be slidably secured with the opposing frame beams 104 such that the separation distance 210 between the rack support systems is adjustable along a portion of a length of the opposing frame beams. As illustrated in FIG. 7A, in some embodiments the frame beams 104 can be configured with one or more slide grooves or slots 704. One or more slide bolts 706, pins, or other such structures can extend through the slide slots 704 to be secured with a rack support system. As such, the rack support systems can be slide along the slide slots 704 to adjust the separation distance 210 between the rack support systems. Additionally or alternatively, some embodiments may include one or more slide plates 708, as illustrated in FIG. 7B. The rack support systems 110 are secured with the one or more plates 702 that each include one or more slide grooves or slots 704. The plates can be welded, bolted or otherwise secured with the frame 102 and/or feet posts 106. One or more slide bolts 706, pins, or other such structures can extend through the slide slots 704 to be secured with a rack support system. As such, the rack support systems can be slide along the slide slots to adjust the separation distance 210 between the rack support systems.

Further, the storage racking systems 100 are configured to be lifted by a forklift, floor jack or other such lifting system. Again, in some implementations, the rack support system are positioned and spaced to allow forks of a forklift to insert adjacent to the rack support systems and between two of the feet allowing the product storage racking system to be lifted by the forklift. As such, the storage racking systems typically allow a forklift to engage the storage racking systems from at least two sides such that the forks of the forklift extend parallel to the rack support systems. Some embodiments additionally enable a forklift or other lifting system to engage the storage racking systems from more than two sides.

Figure 8A:
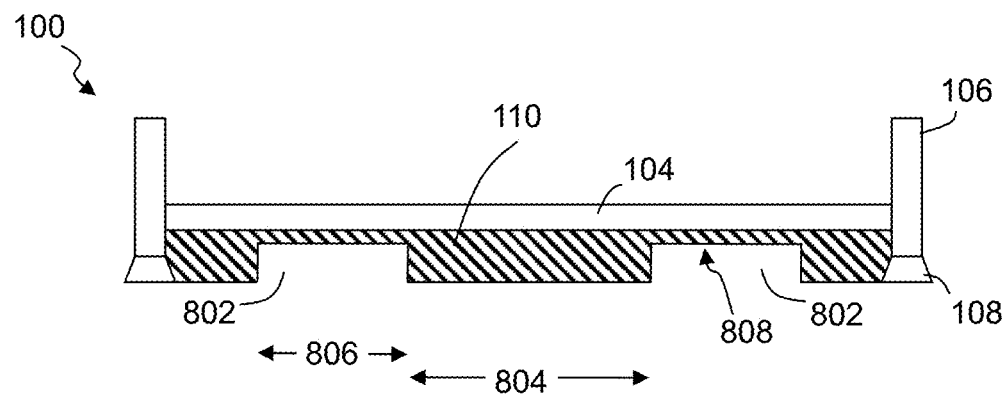
FIGS. 8A-8C illustrate side, plane views of exemplary storage racking systems, in accordance with various embodiments.
Figure 8B:
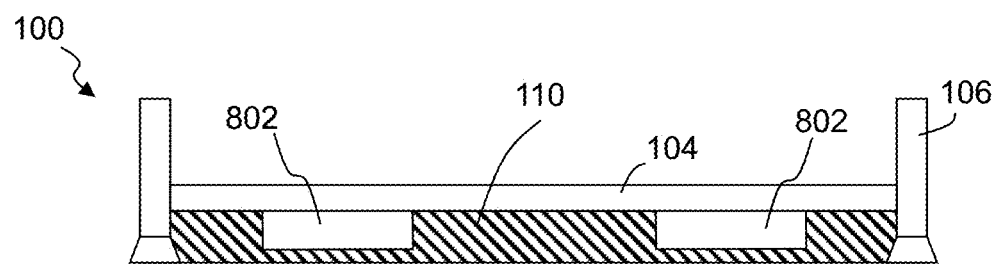
Figure 8C:
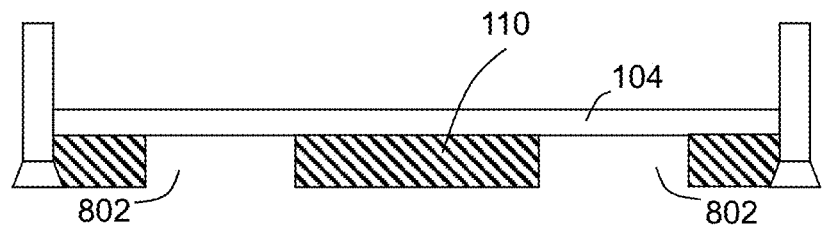

FIGS. 8A-8C illustrate side, plane views of exemplary storage racking systems 100, in accordance with various embodiments, with the rack support systems 110 including one or more fork gaps 802. In some embodiments, the rack support systems each further include at least two fork gaps 802 formed in the rack support systems. The fork gaps are spaced and/or separated by a distance 804 that corresponds with fork spacing on one or more, and typically several different types of lifting systems to each receive a fork of a forklift. Additionally or alternatively, the width 806 of the fork gaps can be configured to be wide enough to allow forks of multiple different types of lifting systems to engage the storage racking systems. In some implementations, the fork gaps are formed as cut-outs at the foundation surface 212 of the one or more rack support systems (e.g., see FIG. 8A). In such a configuration, the forks of a lifting system can insert into the fork gaps 802 (e.g., by moving along the floor), and when a lifting force is applied by the lifting system the forks contact a recessed surface 808 in lifting the storage racking system 100. In other embodiments, the fork gaps 802 are formed as cut-outs such that the forks, when inserted into the fork gaps, contact one or more of the frame beams 104 and lifts by applying a force on the one or more frame beams (e.g., see FIG. 8B). Additionally or alternatively, one or more of the rack support systems is formed from multiple pieces with the fork gaps 802 being defined between pieces of the rack support system (e.g., see FIG. 8C).

Figure 9:
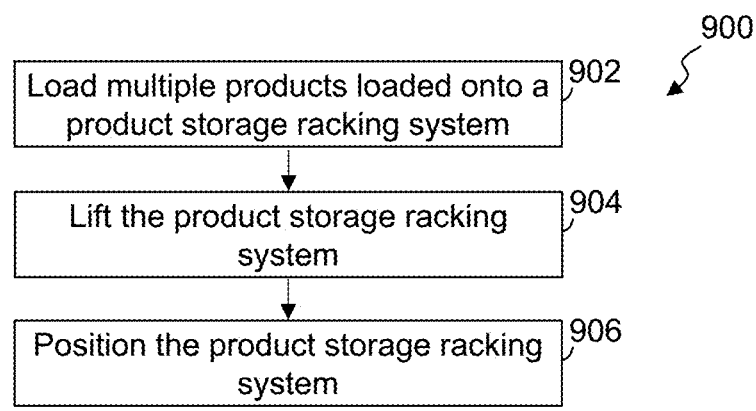
FIG. 9 illustrates a simplified flow diagram of an exemplary process of temporarily storage products, in accordance with some embodiments.

FIG. 9 illustrates a simplified flow diagram of an exemplary process 900 of temporarily storage products, in accordance with some embodiments. In step 902, multiple products are loaded onto a product storage racking system 100. The loading can be implemented by a human, a product conveyor and/or sorting system, or other such methods. In step 904, the product storage racking system is lifted. In some instances, a forklift, floor jack or other such lifting system is positioned relative to the storage racking system 100 with forks or other such extensions of the lifting system positioned between at least two of the feet of the storage racking system. Further, in some applications the rack support systems 110 are separated by a separation distance 210 that enables the forks of the lifting system (e.g., forklift) to be inserted adjacent the rack support systems allowing the product storage racking system to be lifted by the forklift. As such, the forks can be positioned adjacent the two rack support systems and between two of the feet, and the lifting system activated to lift the product storage racking system 100 while the forks of the forklift are inserted between the two feet and adjacent the two rack support systems.

In step 906, the product storage racking system 100 is positioned and/or placed on one of a set of posts 502 cooperated with another product storage racking system and extending from and above the other product storage racking system, on a pallet rack 400 such that at least two of the rack support systems 110 of the product storage racking system rest on two crossbeams and span a separation distance 404 between the two crossbeams 402 of the pallet rack, or a planar surface (e.g., elevated shelf, the ground, etc.). As such, the product storage racking system 100 is configured to be positioned on the set of posts cooperated with the second product storage racking system while supported by the feet of the first product storage racking system and separately be positioned on the pallet rack while supported by the rack support systems. In some implementations, the storage racking system 100 is positioned onto the pallet rack 400 such that at least two rack support systems 110 of the storage racking system rest on and span the separation distance between the two crossbeams 402 of the pallet rack supporting the weight of the storage racking system and one or more products loaded on the storage racking system independent of the feet 108 of the storage racking system. The rack support systems are further configured to rest on relatively flat or planar surfaces (e.g., floor, shelf, etc.) and distribute the weight of the product storage racking system, and a weight of one or more products loaded on the product storage racking system, over the surface in contact with the foundation surfaces 212 of the rack support systems 110 when the product storage racking system is placed on a flat surface.

Again, multiple storage racking systems can be cooperated with a first storage racking system being mounted on a second storage racking system. In some embodiments, the first storage racking system is positioned on the set of posts cooperated with the second storage racking system by positioning a foot 108 of the set of feet of the first storage racking system on each post of the set of posts such that the feet 108 of the first storage racking system support the weight of the first storage racking system and the one or more products loaded on the first storage racking system independent of rack support systems 110 of the first storage racking system. Further, in some instances, the positioning the set of feet of the first product storage racking system on the set of posts includes mating a post coupling of each of the feet with a post coupling mating structure of each of the posts. This allows the cooperation and/or mating of the post couplings of the feet 108 with post coupling mating structures 508 of the posts 502.

In some embodiments, systems, apparatuses and methods are provided to provide greater flexibility in storing products. In some embodiments, a product storage racking system is provided that comprises: a frame comprising three or more frame beams secured together to form the frame with support surfaces of the frame beams aligned along a first plane; three or more feet posts fixed to one or more of the frame beams; three or more feet each cooperated with one of the feet posts, and each of the feet is configured to stackably cooperate with a post of a set of posts that are cooperated with another product storage racking system enabling stacking of multiple of the product storage racking systems and separated by lengths of the set of posts; at least two rack support systems each secured with at least one of the frame beams of the frame and are configured to support the weight of the product storage racking system and products stored in the product storage racking system independent of the three or more feet, wherein the rack support systems are separated from each other by at least a second distance and each comprises a foundation surface, wherein the foundation surfaces of the at least two rack support systems are aligned along a second plane (e.g., plane 214) that is generally parallel with the first plane, and the second plane is separated from the frame by at least the first distance.

Some embodiments provide methods of temporarily storage products that comprise: loading one or more products onto a first product storage racking system; lifting the first product storage racking system; and positioning the first product storage racking system on one of: a set of posts cooperated with a second product storage racking system and extending from and above the second product storage racking system; and a pallet rack such that at least two rack support systems of the first product storage racking system rest on and span a separation distance between two crossbeams of the pallet rack; such that the first product storage racking system is configured to be positioned on the set of posts cooperated with the second product storage racking system while supported by the feet of the first product storage racking system and separately be positioned on the pallet rack while supported by the rack support systems.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product storage racking system, comprising:
   a frame comprising at least four frame beams secured together to form the frame with support surfaces of the frame beams aligned along a first plane;
   at least four feet posts fixed to at least two of the frame beams;
   at least four feet each cooperated with one of the feet posts, and each of the feet is configured to stackably cooperate with a post of a first set of posts that are cooperated with a separate second product storage racking system enabling stacking of multiple of the product storage racking systems and separated by lengths of the first set of posts; and
   two or more rack support systems each secured with at least one of the frame beams of the frame and are configured to support the weight of the product storage racking system and products stored in the product storage racking system independent of the feet, wherein the rack support systems are separated from each other by at least a second distance and each comprises a foundation surface, wherein the foundation surfaces of the rack support systems are aligned along a second plane that is generally parallel with the first plane, and the second plane is separated from the frame by at least a first distance;
   wherein the two or more rack support systems each comprise sections extending from one of the frame beams and along at least a portion of a length of the frame such that at least two of the two or more rack support systems are configured to rest on and span a separation distance between two crossbeams of a pallet rack;
   wherein the at least two of the two or more rack support systems extend along the length of the frame and are secured on opposite ends of the rack support systems with opposing frame beams of the frame beams; and
   wherein the at least two of the two or more rack support systems are slidably secured with the opposing frame beams such that the second distance between the rack support systems is adjustable along a portion of a length of the opposing frame beams.

2. The product storage racking system of claim 1, wherein the two or more rack support systems each further comprise at least two fork gaps formed in the two or more rack support systems and spaced to each receive a fork of a forklift.

3. The product storage racking system of claim 1, wherein the rack support systems are separated by the second distance enabling forks of a forklift to insert adjacent the rack support systems and between at least two of the feet allowing the product storage racking system to be lifted by the forklift.

4. The product storage racking system of claim 1, wherein the two of the two or more rack support systems are fixedly secured with two of the frame beams at opposite ends of the rack support systems and immobile relative to the frame.

5. The product storage racking system of claim 1, wherein each of the feet posts comprises a first post coupling configured to removably couple with a separate post of a second set of separate posts; and wherein each of the feet comprises a second post coupling configured to receive and stackably cooperate with one of the first set of posts that is cooperated with the second product storage racking system.

6. The product storage racking system of claim 1, wherein the feet posts are each fixedly secured at different junctions between two of the frame beams such that the junctions secure the frame beams relative to each other forming the frame.

7. The product storage racking system of claim 1, wherein the frame further comprises one or more cross-supports, wherein each of the one or more cross-supports is fixed with and extending between two of the frame beams.

* * * * *